United States Patent
Geng

[19]

[11] Patent Number: 6,147,760
[45] Date of Patent: Nov. 14, 2000

[54] HIGH SPEED THREE DIMENSIONAL IMAGING METHOD

[76] Inventor: Zheng Jason Geng, 10605 Concord St #500, Kensinton, Md. 20895

[21] Appl. No.: 09/372,980

[22] Filed: Aug. 12, 1999

Related U.S. Application Data

[63] Continuation-in-part of application No. 08/720,462, Sep. 30, 1996, Pat. No. 6,028,672, which is a continuation-in-part of application No. 08/397,766, Aug. 30, 1994, Pat. No. 5,675,407.

[51] Int. Cl.[7] .................................................. G01B 11/24
[52] U.S. Cl. ......................... 356/376; 356/3.01; 356/375
[58] Field of Search ................. 356/3.01, 3.02, 356/3.03, 3.04, 3.06, 3.07, 375, 376

[56] References Cited

U.S. PATENT DOCUMENTS

| | | | |
|---|---|---|---|
| 4,864,395 | 9/1989 | Tajima | 348/136 |
| 5,157,487 | 10/1992 | Tajima | 348/139 |

OTHER PUBLICATIONS

Tajima, Johji "Rainbow Range Finder Principle for Range Data Acquisition" C&C Information Technology Research Laboratories, NEC Corporation 4–4–1, Miyazaki, Miyamai–ku, Kawasaki 213, Japan, 1987 IEEE.

*Primary Examiner*—F. L. Evans
*Attorney, Agent, or Firm*—Ronald P. Kananen; Rader, Fishman & Grauer

[57] ABSTRACT

A three-dimensional (3D) surface profile measurement method and apparatus uses projected energy with a known spatially varying wavelength distribution over the surface of objects in a scene. The varying wavelength of the light corresponds to the angle at which the light is emitted from a light source. Given this correspondence, light reflected from the scene can be identified by wavelength as to angle at which it was emitted. Triangulation can then be used to determine the distance to the point in the scene from which the detected light is reflected. When performed over a number of points on the scene, a three-dimensional profile of the scene can be generated.

20 Claims, 10 Drawing Sheets

DISPERSION OF WHITE LIGHT BY A PRISM:
THE VARIATION OF THE REFLECTIVE INDEX OF THE GLASS
CAUSES COLORS TO BE SPATIALLY SEPARATED OR DISPERSED.

FIG. 5

FRAUNHOFER DIFFRACTION

HIGH SPEED THREE DIMENSIONAL IMAGING METHOD

RELATED APPLICATIONS

The present application is a continuation-in-part of a previous application, U.S. Ser. No. 08/720,462 filed Sep. 30, 1996 (now U.S. Pat. No. 6,028,672) (which is incorporated herein by reference in its entirety), which is a continuation-in-part of a previous application, U.S. Ser. No. 08/397,766 filed Aug. 30, 1994 (now U.S. Pat. No. 5,675,407) (which is incorporated herein by reference in its entirety).

FIELD OF INVENTION

The present invention relates to the field of generating a three-dimensional surface profile of three-dimensional objects by determining the distance to various points on the object or objects being examined. More specifically, this invention relates to a method and apparatus for making three-dimensional (3D) surface profile measurements based on the principles of triangulation and the reflection of spectral light illumination with a spatially varying wavelength. This method is called the "color ranging method".

DESCRIPTION OF RELATED ART

Stereo Vision Systems

A conventional method of measuring a three dimensional (3D) surface profile of an object is called stereo vision. A stereo vision system uses two cameras to observe a scene just as with human vision. By processing the two images, the 3D surface profile of objects in the scene can be computed. The stereo method works by finding a common feature that is visible in both of the two images. Therefore, the three dimensional surface profile information cannot be obtained using data from just a single pixel, instead, such information must be extracted from a group of pixels representing features, such as edges and corners. In addition, stereo vision is very computationally intensive and, with the current state of the art, cannot be used to generate successive frames of an imaged scene in real-time.

Range From Focus Systems

It is possible to generate range data from focus information. Using a high speed image processing computer, the sharpness of an image can be measured in real-time at any point in the image where there is a distinguishable feature. There is a direct relationship between focus and range, so that if focus can be determined in real-time, range can likewise be determined in real-time. In order to determine the range to a multiplicity of points the sharpness of focus must be determined for each of those points. In order to obtain this information, many images must be captured at different focal distances. If a part of the image is determined to be in focus, then the range to that part of the image can be easily calculated. The focal length must, in effect, be swept from the near field (unfocused) to just right (in focus) to the far field (unfocused). Obtaining range information from the focus method requires expensive equipment. Moreover, it is slow because many different focus settings must be used and, at each focus setting, a new image must be captured and analyzed. Furthermore, only the range to features which can be brought into and out of focus can be computed.

Time-of-Flight Systems 3D ranging methods can also be based on the concept of making a time-of-flight measure to directly determine the distance to a point on an object by measuring the time required for a light pulse to travel from a transmitter to the surface of the object and back to a receiver. A related method involves the measurement of the relative phase of modulated received and transmitted light. The "laser radar" approaches actually scan with a single spot, and effectively measures the range to each point in the image one point at a time. Scanning of the light beam is required in order to obtain a full frame of range image, and hence is limited in speed.

Active Triangulation Systems

Range finding by triangulation is based on the fact that, if a base line and two angles of a triangle are known, the lengths of the other sides may be determined. In the most straightforward form of active triangulation, a beam of light is used to form a bright stripe on an object's surface, and a camera displaced by a known distance (base line) from the light source views the scene. One angle of the triangle is defined by the angle between the base line and the beam of light. The other angle is measured via the position of the light strip in the camera (CCD array or lateral effect photodiode).

Structured Illumination Systems

In both the light stripe (active triangulation) and the single dot (laser radar) approach, the projected light must be scanned over the scene for a complete overall measurement to be made. The need for scanning may be eliminated and the efficiency of these systems increased with use of a two-dimensional CCD camera. Such a camera may allows significantly increased efficiency by simultaneously imaging the projection of a pattern of light such as an array of dots, stripes, or a grid projected onto the scene. However the problem of ambiguity is aroused as to matching each of the stripes in the image with each projected strips. Furthermore, such method can not achieve single pixel resolution of range image because processing information from a group of pixels is required to determine the location of a structured light element (a dot or a stripe) in the image.

Active Triangulation Using A Special CCD Camera

Assuming that the plane of light scans rapidly across the scene so that the entire scene is scanned within one frame time, a special CCD camera is built so that the output values of the camera pixels represent the angle at which the scanning line hit that pixel, instead of the amount of light which has hit that pixel. The geometry of the CCD array provides additional angle associated with the pixels so the range can be calculated based on these two angle and the length of the base line. The camera pixels are implemented using capacitors which store given charges before plane light scanning starts and gradually discharge when the scanning starts until the bright line image passes through the pixels. Arithmetic logic is then used to count the remaining charges on the capacitors and provides angle information. This method is able to provide a high speed and single pixel resolution range image. However, it requires scanning a plane of light.

Moirée Contouring Systems

Moirée techniques use some form of structured light, typically a series of straight lines in a grating pattern, which is projected onto an object in the scene. This pattern on the object is then viewed from some other angle through a secondary grating, presenting a view of the first grating lines which have been distorted by the contour of the object. The viewed image contains the moirée beat pattern. To determine the 3D contour of the object, the moirée techniques based on the phase shifting, fringe center mapping, and frequency shifting rely heavily on both extensive software analysis and rigorous hardware manipulation to produce different moirée patterns of the same object.

SUMMARY OF THE INVENTION

An object of the present invention is to provide an automatic high speed, low-cost, multi-mode three-dimensional (3D) surface profile measurement method and apparatus. The invention uses at least one light source to illuminate the object in the scene with light (or other radiant energy) which varies in wavelength across the spectrum depending on an angle from the light source. At least one 2D image sensor array then generates a full frame image of the scene. An important aspect of this approach is that the projected light has a known spatially varying wavelength across the spectrum, preferably in the visible or near-visible range, such that different points on the scene is illuminated by the projected radiation energy with different wavelengths, the wavelength corresponding to an angle between a baseline (between the energy source and the 2D image sensor array) and the ray of energy incident on a given point of the 3D space. The pixels of the 2D image sensor used in this method are able to detect and to uniquely distinguish the wavelength of the radiation energy at the points of interest on the scene.

Each pixel of the 2D image sensor is also associated with a unique ray in 3D space through the focal point of the image sensor optical system so that the angle between the image sensor axis and the energy ray is known based on the wavelength of the energy received. The energy projection ray and the observation line-of-sight from the image sensor intersect on the surface of the object in the scene. This gives us a typical triangulation problem that can be solved for the range value associated with each pixel. Since the pixel values of image obtained by the 2D image sensor contain the sufficient geometry information of the projection ray of the radiation energy, full frames of 3D range images can be obtained directly at the frame acquisition rate of the 2D image sensor array. By "full frame of 3D range image" we mean that the value of each pixel in the image will represent the distance from the image sensor's focal point to the corresponding point in the scene. This method eliminates the time consuming corresponding feature finding problem of normal binocular 3D imaging systems.

The color ranging method is able to capture full frame 3D range data at the frame rate of the camera. Therefore, it is suitable for high speed, real-time measurement automation. Since there are no mechanical moving parts in our color ranging method, the mechanical design can be very simple and reliable. All components in this system are available off-the-shelf which leads to low cost. With the active light source being turned on or off, the same color camera can provide normal intensity images as well as 3D range data. This multi-mode capability greatly simplifies the problems of multiple sensor integration and sensor data fusion. Depending on the applications, the scope of the color spectrum of the energy projector can be selected from the UV, visible, or IR light regions. The color ranging method is not based on a laser therefore there is no potential hazard to users' eyes. This is certainly a desirable feature to enable this system to be used for other commercial applications, such as medical applications like evaluations for facial plastic reconstructive surgery.

DESCRIPTION OF THE PREFERRED EMBODIMENTS

The operation of the color ranging method is straightforward. The color spectrum of projected light on the scene has a one-to-one correspondence between the projection angle of each vertical plane of light and a particular color or wavelength of project light (or other energy). The color spectrum of each pixel on the image captured by the camera provides the necessary geometrical information, in addition to the coordinates of the pixel, to facilitate the triangulation of the 3D range calculation.

Figure 1:
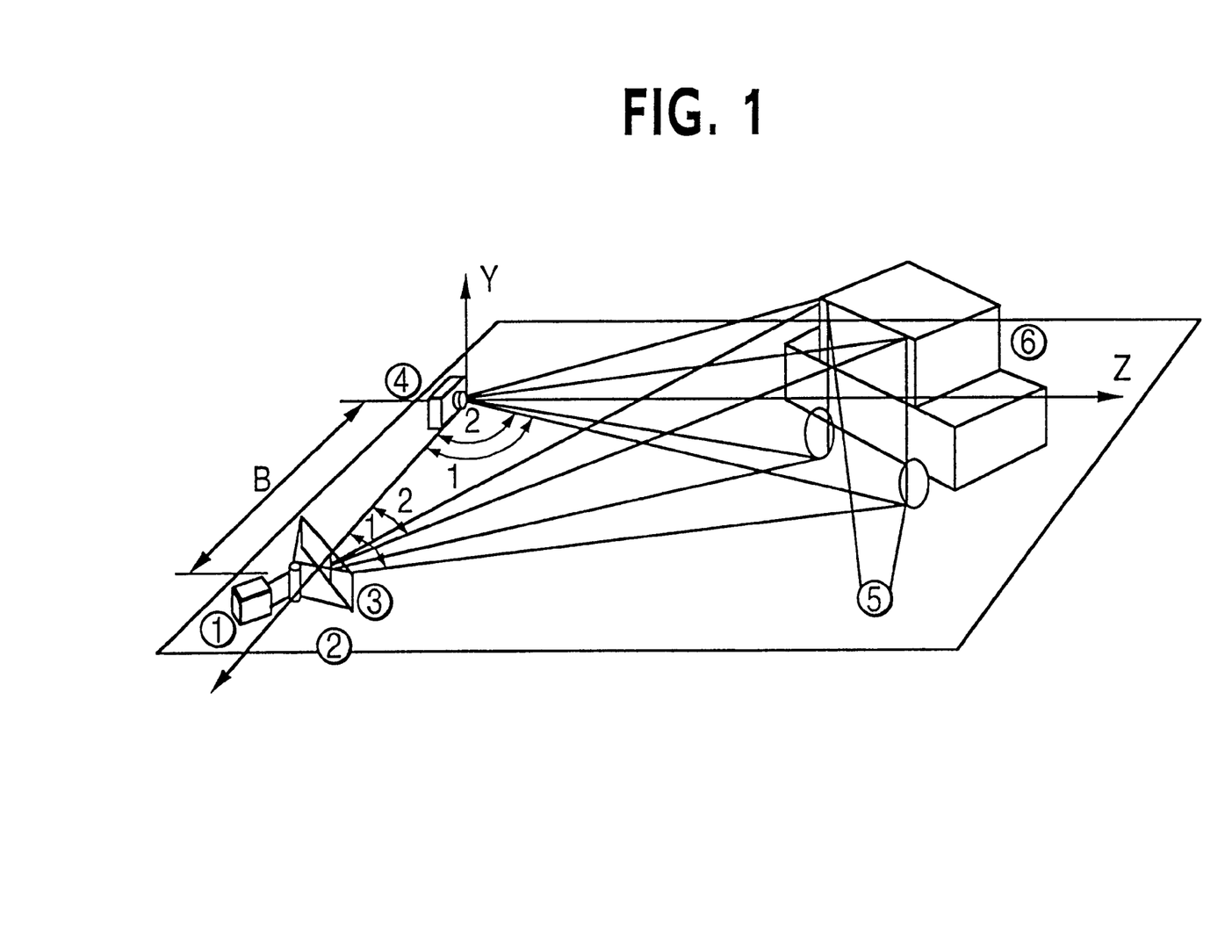
FIG. 1 shows one embodiment of the present invention of the color ranging method. The plane of light projector, marked 1, generates a sheet of white light which passes through a cylindrical lens, marked 2, to form a "fan beam" light source. This fan beam light passes through a linear variable wavelength filter (LVWF), marked 3, to illuminate the scene containing objects of interest, marked 6. The reflected light is detected by the color camera, marked 4. Reference character B represent the baseline length. The darker and lighter shadow sheets of lights, marked 5, depict two light stripes with different spectrums (wavelength).

One embodiment of the present invention of the color ranging method is shown in FIG. 1. The plane of a light projector, marked 1, generates a sheet of white light which passes through a cylindrical lens, marked 2, to form a "fan beam" light source. This fan beam light passes through a linear variable wavelength filter (LVWF), marked 3, to illuminate the scene containing objects of interest. The reflected light is detected by the color camera, marked 4. The procedures of constructing the described optical system are easily understood by those skilled in art of optical system design. Notice that for convenience of in the explanation of the principles of operation of the invention, a LVWF is used in FIG. 1. The present invention is not restricted to the use of an LVWF to produce the desired spectral pattern of energy radiation. In fact, any means that can provide a registered relationship between spatial the distribution of projected energy rays and the wavelengths of the rays may be used in the color ranging system.

If a visible range LVWF is used, the color spectrum of pixels on the captured image is determined by the proportion of Red, Green and Blue components (RGB). The color spectrum of each pixel has a one-to-one correspondence with the projection angle of the plane of light due to the fixed geometry of the cylindrical lens and the LVWF. Therefore the color spectrum provides the angle θ. Together with the coordinates of each pixel on the camera image plane and the known baseline from camera to cylindrical lens, the color spectrum provides all necessary information to determine the 3D range (x,y,z) of any spot on the surface of objects seen by the camera.

The darker and lighter shadow sheets of lights shown in the FIG. 1 depict two light stripes with different spectrums (wavelength). They are generated by white light filtered through different vertical portions of the linear variable wavelength filter. The difference between spectrums of projected light stripes can be sensed by the color camera and the projection angles of $\theta_1$ and $\theta_2$ can be found based on the filter characteristics and the detected spectrums of darker and lighter light strips. Therefore the range data for the surface area corresponding to the darker and lighter light strips can be easily computed.

The major components of our color ranging system are a white fan beam generator, a color camera, and a linear variable wavelength filter (LVWF). The white fan beam can be produced by using a plane of light generator and a cylindrical lens. The camera, marked 4, may also comprise a processor or other computerized device for performing the necessary calculations to determine the distance to the various points in the imaged scene using the wavelength of light received from that point and the angle known to correspond to that wavelength based on the predetermined characteristics of the light source, comprising the actual source (1), cylindrical lens (2) and LVWF (3). Alternatively, the camera may be an off-the-shelf product which is connected to a processor or other computerized equipment for performing the necessary calculations.

Figure 2:
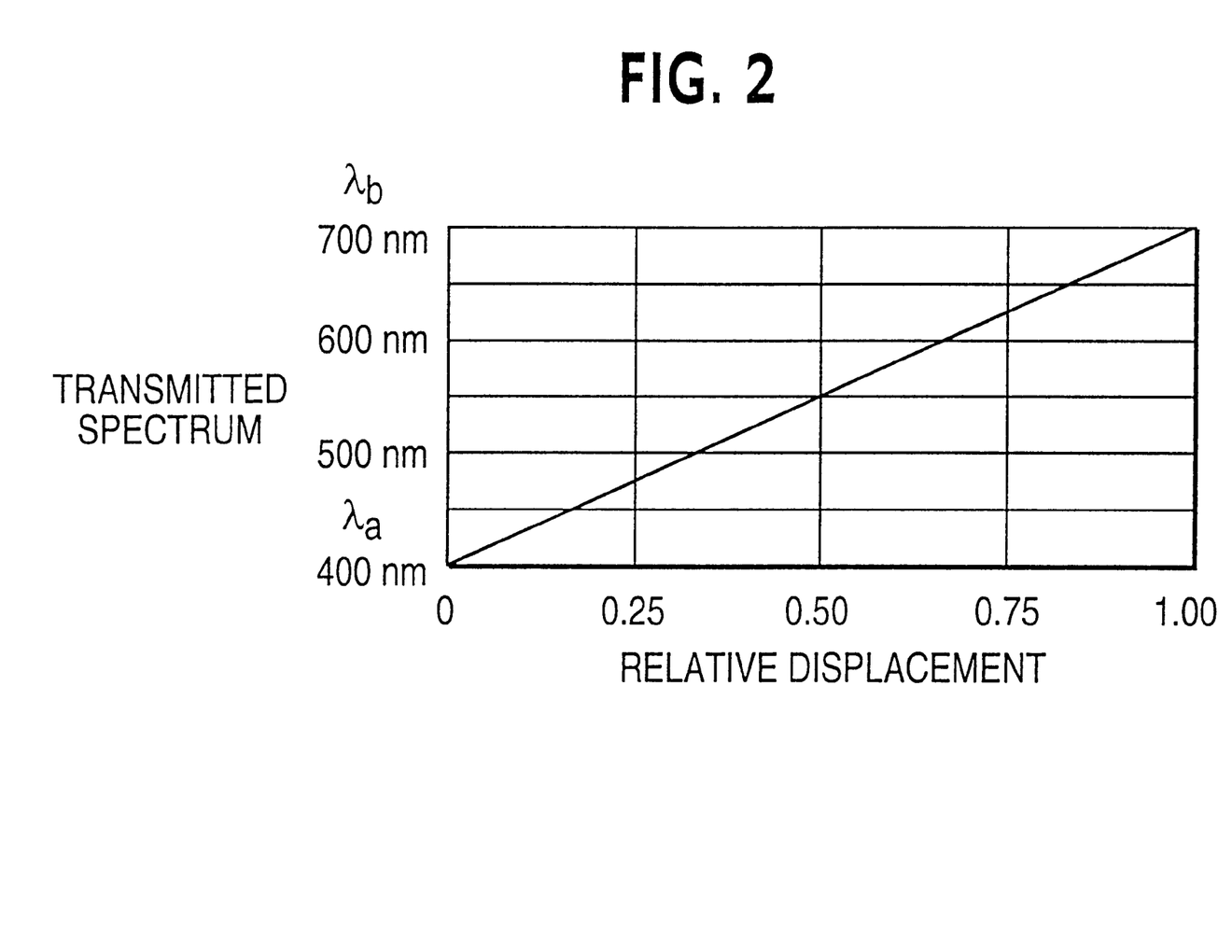
FIG. 2 plots measurement data showing the linearity of the LVWF.

The LVWF is a optical filter product commercially available. It is a rectangular optical glass plate coated with gradually varying wavelengths of colors. If the color spectrum of a LVWF is within the visible light region, one edge of the filter rectangle corresponding to the shortest wavelengths, i.e., blue to violet, while the opposite edge corresponds to the longer wavelengths, i.e. red. The wavelength of the coated color layer is linearly proportional to the displacement of the position on the filter glass from the blue edge. This feature provides a simple and elegant way of generating structured light for an entire scene without using any moving parts. FIG. 2 plots measurement data provided by the manufacturer for its linearity. The color wavelength of the light λ passing through a particular position of the LVWF is a linear function of d, the displacement of that position from the blue edge of the filter glass:

$$\lambda(d) = \lambda_a + \frac{(\lambda_b - \lambda_a)}{L} d \quad (1)$$

where $\lambda_a$, $\lambda_b$ and L are filter parameters: $\lambda_a$ is the wavelength corresponding to the filter's "blue edge" (lowest wavelength color the filter can generate). $\lambda_b$ is the wavelength corresponding to the filter's "red edge" (highest wavelength color the filter can generate). L is the effective length of the filter. And d is the displacement from the blue edge.

The relative position of the LVWF is fixed with respect to the cylindrical lens so that the projected color through the LVWF corresponds to the angle θ between the light stripe projected through this line and the Projector-Camera base line b which is fixed. This fixed color-to-angle relationship is a key idea for the present invention's color ranging system.

In addition to the LVWF for the visible light spectrum, other filters can also be used in the ranging system based on the color ranging method. For example, LVWF filters in the ranges of near infrared, mid-infrared, long infrared, and ultraviolet are also available commercially off-the-shelf.

The manufacturers of the LVWFs claim that the linearity is better than 1%. The absolute linearity is not important as long as the non-linearity of the LVWF's distribution function does not affect the one-to-one relationship between wavelength and the displacement from the shortest wavelength edge of the LVWF. Proper calibration procedures can be designed to record the actual distribution function in a look-up table.

A static calibration fixture can be designed with a known position and orientation with respect to the projector (cylindrical lens and LVWF) and camera. The fixture surface will cover the entire span of projected light and the reflectance function of the fixture is also known. By recording the light spectrum of reflected light from the fixture and the physical location of the spot, one can build a look-up table to store the true distribution function of a LVWF. The look-up table will be used to determine the projection angle θ.

Notice that other than the white fan beam light source shown in the FIG. 1, a point light source can also serve the purpose of providing illumination of the scene. The selection between them is matter of engineering judgment.

Figure 3:
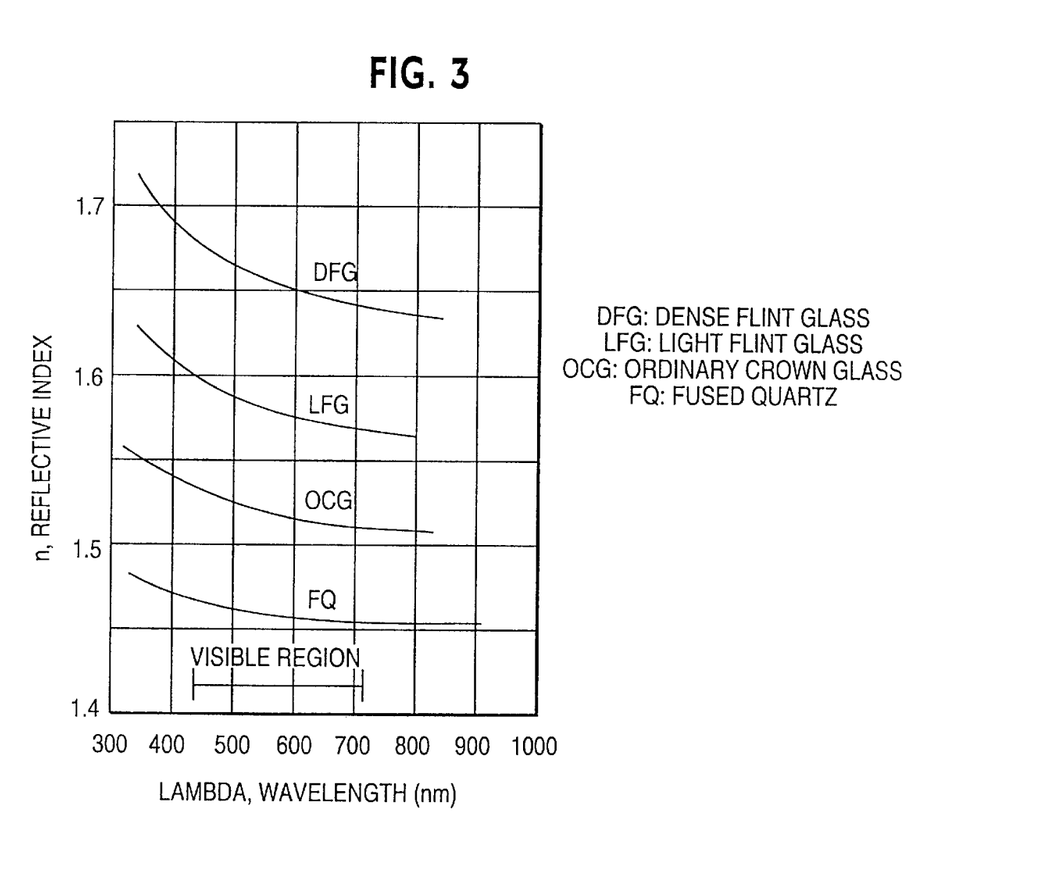
FIG. 3 shows the reflective index of three important types of glass and fused quartz varying with wavelength in the visible region.

Another embodiment of the color projection system used in the color ranging method is to utilize the dispersion phenomena of an optical prism to produce a spatially variable wavelength illumination. The refraction of several types of optical glass varies with the wavelength of the incident radiation. FIG. 3 shows this variation in the visible region for three important types of glass and for fused quartz. When white light, which consists of light with all colors (wavelength), enters a substance, the variation of the reflective index with wavelength causes the various colors to be spatially separated or dispersed.

Figure 4:
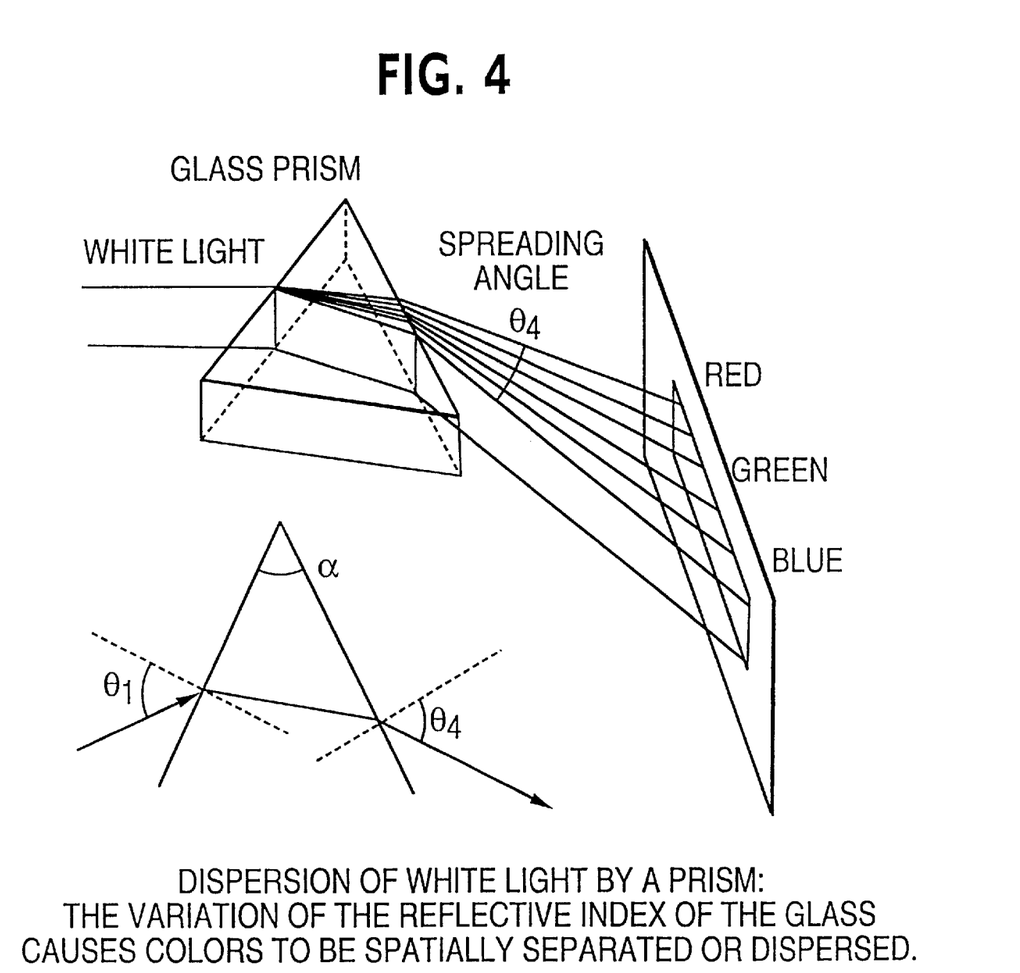
FIG. 4 illustrates a way to generate the spatially varying wavelength illumination using a prism. The white color is dispersed into a rainbow type of color spectrum.

A simple device that exhibits dispersion effectively is a triangular piece of glass or prism. When white light incident on a prism, the deviation angle is different for each color. The white color is then dispersed into a rainbow spectrum of colors, as illustrated in FIG. 4. Because n(red)<n(Blue) for the materials listed in FIG. 3, the red light is deviated less than blue light in passing through the prism.

The spreading angle Δθ4 of a spatially variable illuminating device based on a prism can be calculated and optimized in terms of its refractive angle α and incident angle θ1:

$$\sin\theta_4 = n \sin\left\{\alpha - \sin\left(\frac{\sin\theta_1}{n}\right)\right\} \quad (2)$$

where n is the reflective index of prism material. for a typical prism, the spreading angle Δθ4 can archive about 20 degree.

Figure 5:
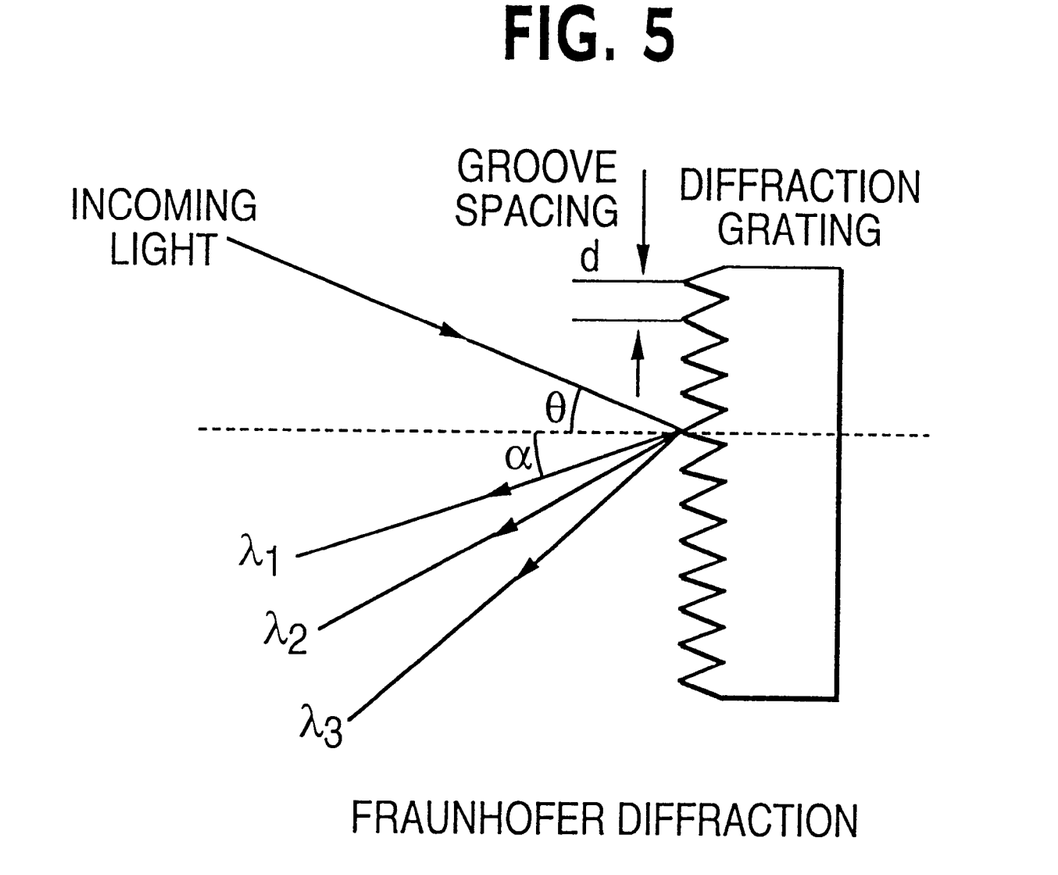
FIG. 5 shows a way to generate the spatially varying wavelength illumination using diffraction gratings.

Still another embodiment of the color projection system used in the color ranging method is to utilize the diffraction gratings to produce a spatially variable wavelength illumination, as illustrated in FIG. 5. For a given incident light ray, the angle θ represents the angle between the axis normal to the grating surface and the ray direction. The light reflected (diffracted) by the grating surface is decomposed into many wavelength components. This diffraction is referred to as Fraunhofer diffraction and can be described by:

$$\sin(\alpha) - \sin(\theta) = \frac{m\lambda}{d} \quad (3)$$

where α is the angle between the reflected light and the axis normal to the grating surface, m is an integer representing the order number, λ is the wavelength, and d is the spacing between two adjacent stripes of the grating. We observe that the angle α is dependent on wavelength λ. For a given incident angle θ, ruling (grooving) spacing d and a particular order m, the angular dispersion effect can be obtained as:

$$\frac{d\alpha}{d\lambda} = \frac{m}{\cos(\alpha)d} \quad (4)$$

Figure 6:
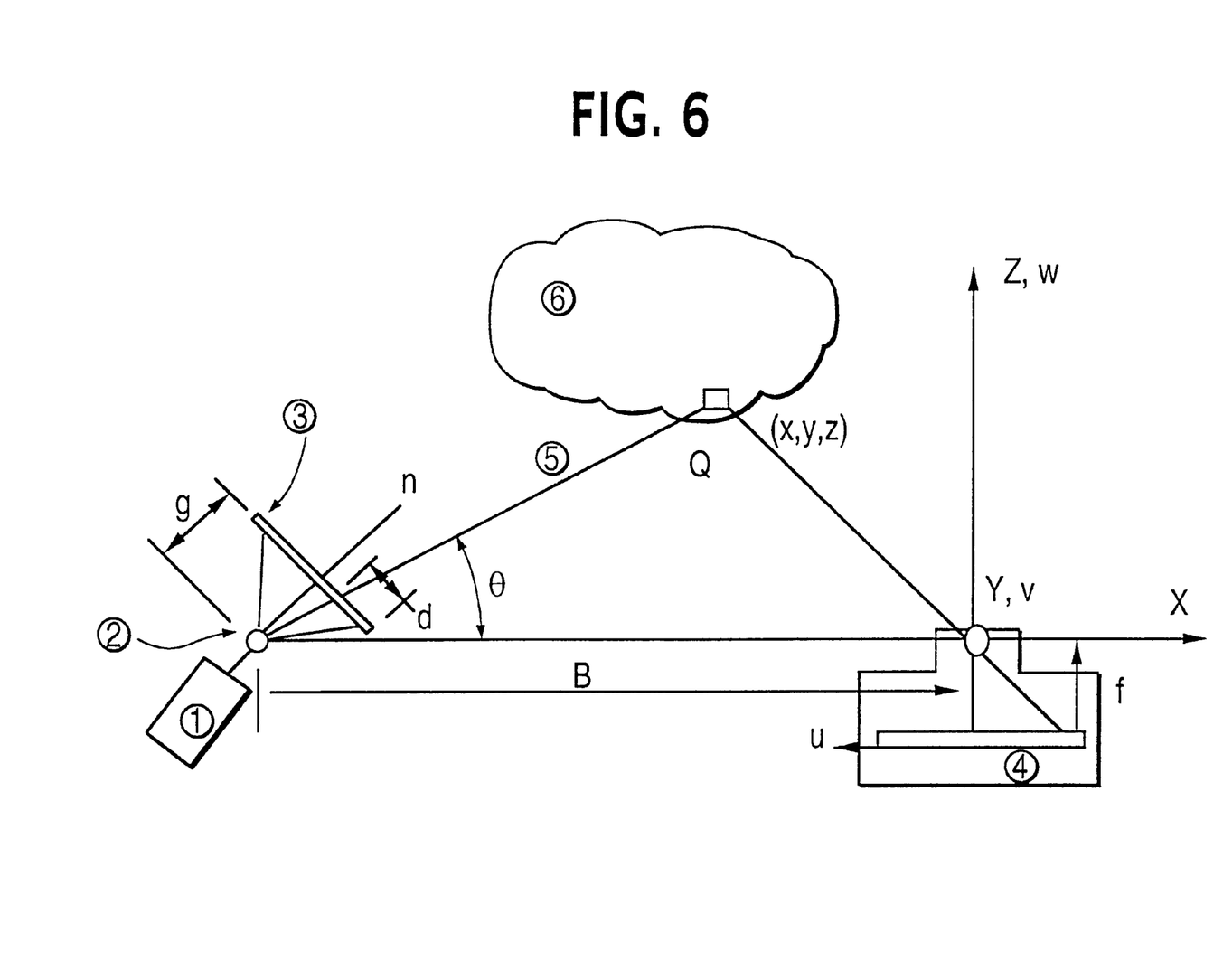
FIG. 6 is used to illustrate the 3D range value calculation procedure for the color ranging method.

The 3D range value calculation algorithms for the present invention of the color ranging system are straightforward and well understood by those skilled in machine vision areas. A typical steps to determine any spot Q on the surface of an object in the scene can be summarized as follows, as shown in FIG. 6:

(1) Find the projection angle θ corresponding to spot Q using the color spectrum data captured by the camera.

The geometry and parameter definitions of the color ranging system are shown in FIG. 3. The cylindrical lens and camera lens form a baseline of the system. The fixed angle between the LVWF surface and the base line is represented by β. The distance between LVWF and the center of the cylindrical lens is g. The Red-Green-Blue ingredients of the pixel color of the image captured by the camera determines the wavelength λ corresponding to any spot on the scene. Given λ corresponding to spot Q on the object surface, the displacement d(λ) can be found as:

$$d(\lambda) = \frac{\lambda - \lambda_a}{\lambda_b - \lambda_a} L \quad (5)$$

Then the angle q can be calculated by:

$$\theta = \beta - \tan^{-1}\frac{L/2 - d}{g} \quad (6)$$

(2) Based on triangulation principle, the 3D coordinates of the points on the object surface can be calculated as:

$$x = \frac{b}{fctg\theta - u} \cdot u$$
$$y = \frac{b}{fctg\theta - u} \cdot v \quad (7)$$
$$z = \frac{b}{fctg\theta - u} \cdot f$$

Figure 7:
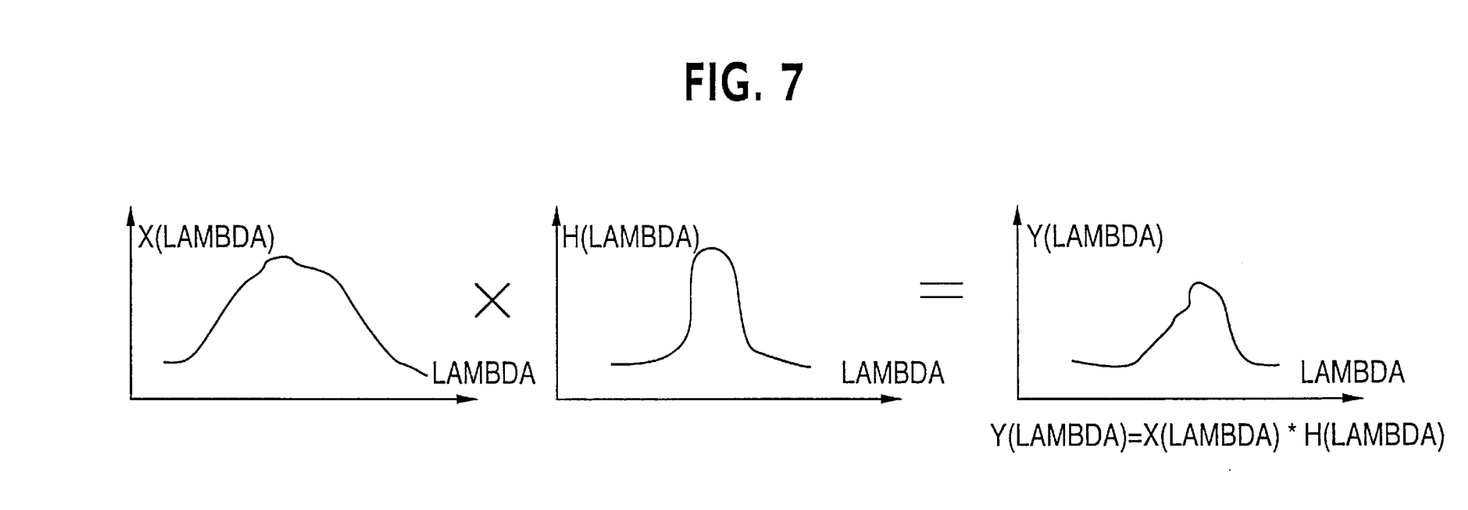
FIG. 7 shows the detected color spectrum of image sensor $Y(\lambda)$ as the convolution of the projected light $X(\lambda)$ with the reflectance function $H(\lambda)$ and sensor sensitivity function $R(\lambda)$.

We now discuss the relationship between projected color light and reflected light spectrum from the surface of an object seen by the image sensor. Suppose that the reflection characteristics of a spot on the object surface is described by a reflectance function H(λ), where λ is the frequency of reflected light spectrum. The spectrum of the projected light illuminating the spot can be expressed as X(λ). Then the reflected light's spectrum can be obtained by the convolution of projected light X(λ) with the reflectance function H(λ) and sensor sensitivity function R(λ). Therefore the following relationship holds in the frequency domain:

$$Y(\lambda) = R(\lambda) * H(\lambda) * X(\lambda) \quad (8)$$

The idea is illustrated by FIG. 7.

In the present invention of the color ranging system, the projected light spectrum X(λ) instead of the light spectrum detected by the camera Y(λ) is of principal concern, since the former provides the critical information of angle θ for triangulation. If the surface color of the object of interest is white, i.e. the reflectance function is uniform within the visible light region, then the reflected light spectrum observed by the camera is exactly the same as the projected light spectrum.

$$Y(\lambda) = X(\lambda), \text{ when } H(\lambda) = 1 \quad (9)$$

Figure 8:
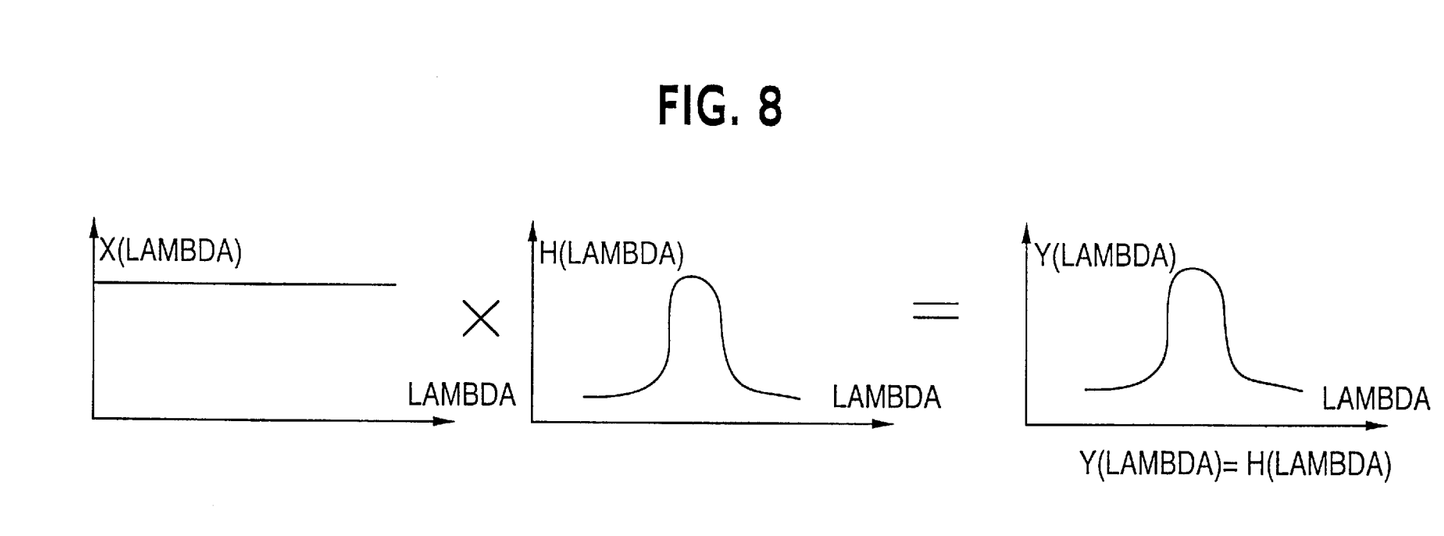
FIG. 8 shows a way to obtain the spectrum reflectance function of the object using the picture taken under the white light illumination.

However, in general, the surface color of the objects of interest is not pure white. Equation (8) indicates that in this case in order to find X(λ) from Y(λ), information about H(λ) has to be known. One practical way to obtain H(λ) experimentally is to project white light first on to the scene. Under the white light illumination, the color spectrum detected by the camera is exactly the reflectance function of the object. See FIG. 8. H(λ) can be easily determined by illuminating the scene with white light and capturing the resulting image.

After obtaining H(λ) the light filtered through the LVWF is projected on the same scene. The detected light spectrum Y(λ) is then used together with H(λ) to obtain X(λ) using a deconvolution technique:

$$X(\lambda) = Y(\lambda)/H(\lambda) \quad (10)$$

The only condition to ensure the applicability of this technique is that the reflectance function should not be absolute zero within the projected light spectrum. In practical situations, this condition would almost always be met.

Figure 9:
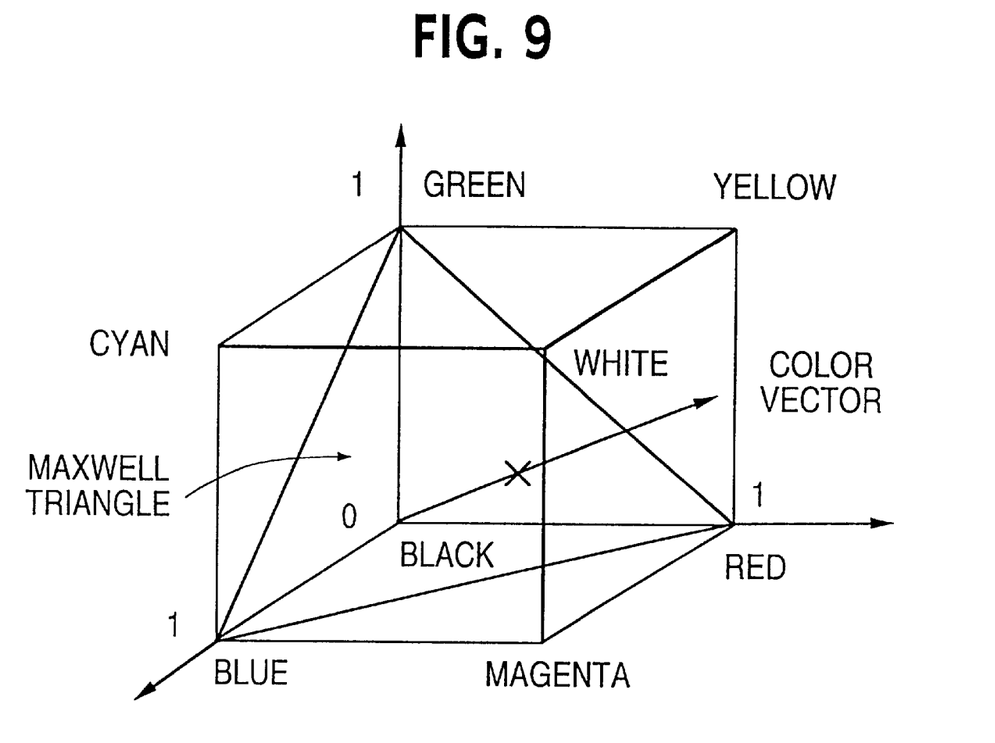
FIG. 9 shows a color detecting scheme using typical red, green, and blue primaries (RGB) as three mutual orthogonal axes. Any spectral light with single wavelength is located at one point on the Maxwell triangle.
Figure 10:
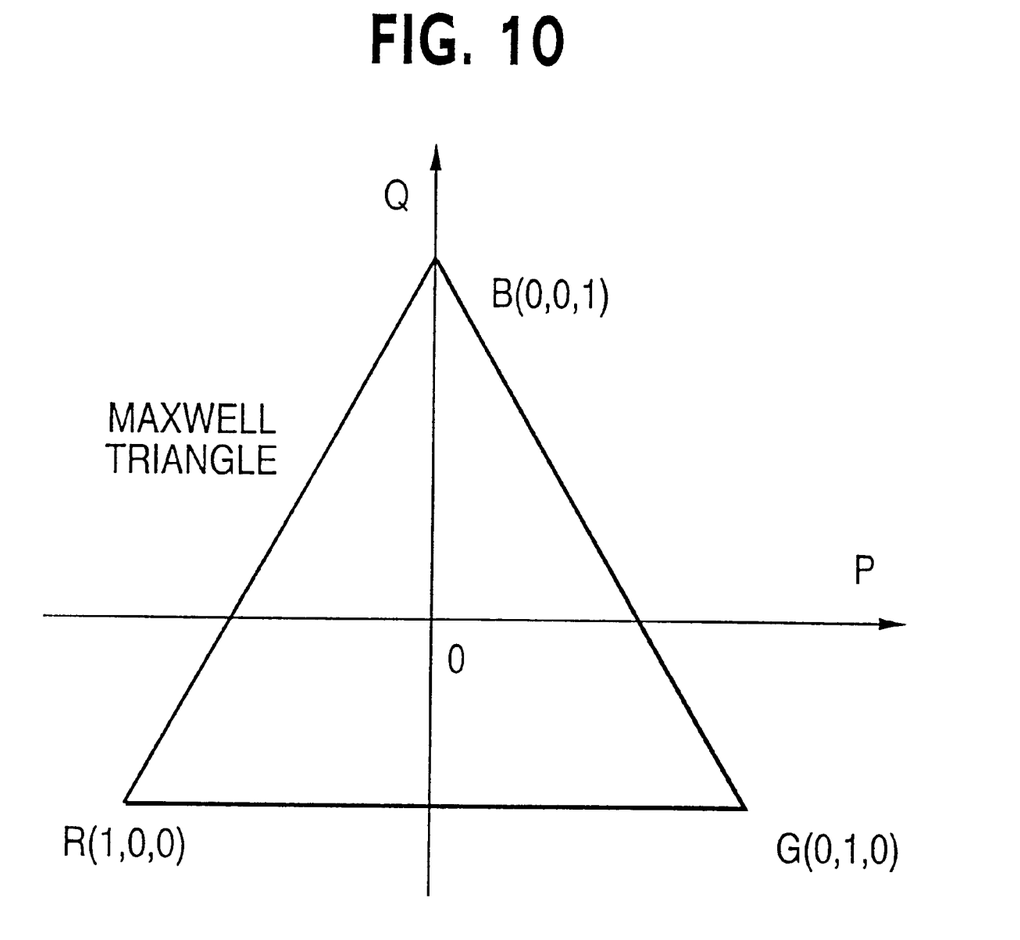
FIG. 10 shows a way to convert the color representation using three components (RGB) to a color representation using two components (PQ) to discount out the effect of intensity.

We now discuss the color-detecting scheme of the image sensor. We use visible light as an example. However, the same scheme can be used for other ranges of electromagnetic energy radiation. A particular color detected by a color camera may be described as a vector in the "color space" whose coordinates are given in the three primary colors. Using typical red, green, and blue primaries (RGB) as three mutually orthogonal axes, a color space is formed as shown in FIG. 9. It is the orientation of the vectors, rather than the length of the vectors, that specify the color. In FIG. 9, the Maxwell triangle was drawn between the three primary colors. There is a one-to-one correspondence between the intersection point of a color vector, which can be computed from a normalized output signal of a color RGB camera, and a detected color. We can further convert the detected color into a PQ representation in a 2D space. The P-Q coordinate system is established based on the Maxwell triangle. One kind of transform from the RGB coordinates to the PQ coordinates is defined as follows:

$$\begin{bmatrix} p \\ q \end{bmatrix} = \begin{bmatrix} -\frac{1}{\sqrt{2}} & \frac{1}{\sqrt{2}} & 0 \\ -\frac{1}{\sqrt{6}} & -\frac{1}{\sqrt{6}} & \frac{2}{\sqrt{6}} \end{bmatrix} \begin{bmatrix} r \\ g \\ b \end{bmatrix}$$

where $$\begin{bmatrix} r \\ g \\ b \end{bmatrix} = \frac{1}{\sqrt{R^2 + G^2 + B^2}} \begin{bmatrix} R \\ G \\ B \end{bmatrix}$$

and R, G, and B are the measured color components of Red, Green, and Blue.

There are no known theoretical limitations on the range accuracy that can be achieved by the color 3D ranging system. The actual accuracy of a specific system will depend on the implementation. The principle factors are the quality of the color camera components available and the resolution of the image frame grabber used. If the camera optical system has no distortion on the color spectrum and if the color image frame grabber has an infinite resolution, then the system should be able to obtain the projected light spectrum on the surface of object on the scene accurately. The equations (1) to (7) can be used to calculate (x, y, z) accurately.

The most popular low cost frame grabbers have 8 bit resolution for each color component of Red, Green, and Blue (RGB). Totally, they are able to distinguish $2^{24}$ color combinations. However, the color spectrum depends on the proportion of RGB ingredients rather the absolute values of each component, therefore the number of discrete color spectrum lines that can be identified by such system should be smaller than $2^{24}$.

The spatial resolution of our color ranging system is limited only by the spatial resolution of the camera optical sensing element. The resolution of the color spectrum of the light projected through the LVWF is infinite due to the continuous nature of the wavelength variation in the LVWF fabrication.

A number of camera manufacturers are currently able to provide a color camera for the disclosed color ranging system with 1024 by 1024 and/or 2048 by 2048 pixel resolution. This level of spatial resolution is comparable with many practical applications, such as initial inspection of tire tread. In cases where a higher spatial resolution is needed, the camera can zoom into a smaller viewing area for detailed inspections.

To further enhance the spatial resolution of the disclosed color ranging system, sub-pixel algorithms can be adopted to achieve sub-pixel accuracy by interpolation between established pixels. In other words, once the distance is established to a group of points on the scene, i.e., pixels in the resulting 3-D profile, interpolation can be used to approximate the 3-D profile of portions of the surface of the object between the identified points. This can enhance the resulting 3-D profile at a sub-pixel level.

In many practical applications, ambient light illuminates the objects on the scene. Ambient light will distort the color spectrum of projected light. If no compensation measure is employed the color ranging system will suffer from a loss of range accuracy.

Ambient light distortion can be easily corrected, however. First, the light projector is deactivated and an image or frame of the scene being profiled is captured under ambient light. This stored image can be subtracted from the later images captured during the generation of the 3-D profile to correct for any distorting effect due to the ambient light. The difference image would then be used to generate the range map.

The color ranging system described here has multiple mode sensing capability which greatly facilitates the sensor data fusion. The light projector of the color ranging system can be controlled, on or off, by computer controlled means. When the light projector is on, the camera captures a color image by which 3D range data can be obtained for the object on the scene. When the light projector is off, the camera will capture normal light intensity image data for the same scene. The color ranging system provides a multiple sensing mode application using a single camera.

Range data and intensity data, both acquired by the same camera, provide complementary information. Range data provides important clues on the geometry of an observed scene. However, it does not provide any information about physical properties of the scene such as color or intensity. On the other hand, it is extremely difficult to extract geometrical information from intensity image data. Therefore, both types of data can be analyzed together synergetically. In the disclosed color ranging system, there is no correspondence problem between range data and normal intensity image data since they are captured using exactly the same camera in the same place. This feature simplifies multiple sensor fusion over conventional techniques such as stereo vision, where the correspondence between range data and the corresponding point in the intensity image is difficult to determine, and in some cases is impossible to determine.

The invention claimed is:

1. An apparatus for determining a distance to each point in a scene so as to generate a three-dimensional profile of said scene, the apparatus comprising:
   (a) a color camera for detecting and recording said scene, said camera discriminating a wavelength of light received from said scene for points of said scene;
   (b) a light projector for generating light to illuminate said scene for said camera, wherein a wavelength of said light from said light projector varies spatially across said scene such that only light of a particular wavelength is emitted by said light projector at a predetermined angle with respect to a line between said camera and said light projector;
   wherein said apparatus determines a distance to said points of said scene based on distance between said light projector and said camera, the wavelength of received light associated with that point by said camera and an angle corresponding to emission of that wavelength by said light projector.

2. The apparatus of claim 1, wherein said light projector comprises a variable wavelength filter for causing said spatial variation in said light from said light projector.

3. The apparatus of claim 2, wherein said variable wavelength filter comprises a substantially rectilinear transparent plate through which light from said light projector is transmitted, and wherein at least one surface of said plate is coated with a coating having a color which gradually varies over said surface of said plate.

4. The apparatus of claim 3, wherein a wavelength of said coating at any particular distance from an edge of said filter is linearly proportional to said distance from said edge of said filter thereby providing an efficient means of generating a structured light spectrum without the necessity for any moving parts.

5. The apparatus of claim 2, wherein said variable wavelength filter has a color spectrum within the visible light region and one edge of the filter corresponds to a shortest wavelength in the blue range of the visible spectrum and the opposite edge corresponds to a longest wavelength in the red range of the visible spectrum.

6. The apparatus of claim 2, wherein said light projector further comprises a cylindrical lens through which light is dispersed to shine through said filter.

7. The apparatus of claim 1, further comprising a processor for determining said distance to points of said scene based on said distance between said light projector and said camera, the wavelength of received light associated with that point by said camera and an angle corresponding to emission of that wavelength by said light projector.

8. The apparatus of claim 7, wherein said processor is integrated with said color camera.

9. The apparatus of claim 7, wherein said processor has a look-up table that lists said correspondence between wavelengths of said light and angles of light emission with respect to a line between said camera and said light projector.

10. An method for determining a distance to points in a scene so as to generate a three-dimensional profile of said scene, the apparatus comprising:

(a) generating light to illuminate said scene, wherein a wavelength of said light varies spatially across said scene such that only light of a particular wavelength illuminates said scene at a predetermined angle with respect to a line between a camera and a source of said light;

(b) detecting and recording said scene with said camera, and discriminating, with said camera, a wavelength of light received from said scene for points of said scene;

(c) determining a distance to said points of said scene based on distance between said light source and said camera, the wavelength of received light associated with that point by said camera and an angle corresponding to emission of that wavelength by said light source.

11. The method of claim 10, further comprising causing said spatial variation in said light using a variable wavelength at said light source.

12. The method of claim 10, wherein said step of determining further comprises accessing a look-up table that lists said correspondence between wavelengths of said light and angles of light emission with respect to a line between said camera and said light source.

13. The method of claim 10, further comprising compensating for ambient light conditions during said detecting and recording with said camera.

14. The method of claim 13, wherein said compensating for ambient light conditions further comprising:

imaging said scene under said ambient light conditions prior to said step of generating light; and subtracting an image of said scene under ambient light conditions from a subsequent recording taken in said detecting and recording step to eliminate any effect of said ambient light conditions in said subsequent recording.

15. A method of color ranging to capture a full frame of 3D image data of a scene-to-be profiled at the frame rate of a color camera comprising the steps of:

illuminating said scene from a light projector which generates a fan of light, projecting said fan of light through a variable wavelength filter means whereby said scene is illuminated by projected light energy which has a known spatially varying wavelength spectrum whereby points on the scene are illuminated with predetermined radiation energy having a unique wavelength; and detecting said spectrum of reflected light by said color camera whereby the color spectrum detected for pixels of said color camera has a one-to-one correspondence with the projection angle of the plane of light due to a predetermined geometry of the illuminating plane of light and the variable wavelength filter means whereby the detected color spectrum provides an angular measurement for said points on the scene thereby facilitating a triangulation calculation of the 3D range data.

16. The method of claim 15, wherein a visible range variable wavelength filter means is utilized and the color spectrum of each pixel of the detected image is determined by the proportion of red, green, and blue components of said detected color spectrum for each pixel.

17. An apparatus for determining a distance to each point in a scene so as to generate a three-dimensional profile of said scene, the apparatus comprising:

(a) means for imaging said scene and for discriminating a wavelength of light received from said scene for points of said scene;

(b) means for generating light to illuminate said scene, wherein a wavelength of said light varies spatially across said scene such that only light of a particular wavelength is emitted at a predetermined angle with respect to a line between said light generating means and said imaging means;

(c) means for determining a distance to said points of said scene based on distance between said light generating means and said imaging means, the wavelength of received light associated with that point by said imaging means and an angle corresponding to emission of that wavelength by said light generating means.

18. The apparatus of claim 17, wherein said light generating means comprises a variable wavelength filter means for causing said spatial variation in said light from said light generating means.

19. The apparatus of claim 18, wherein said variable wavelength filter means comprises a substantially rectilinear transparent plate through which light from said light projector is transmitted, and wherein at least one surface of said plate is coated with a color coating means having a color which gradually varies over said surface of said plate.

20. The apparatus of claim 18, wherein said light generating means further comprises a means for evenly dispersing light from a light source means to shine through said filter means.

\* \* \* \* \*